United States Patent [19]

Oka

[11] Patent Number: 5,400,080
[45] Date of Patent: Mar. 21, 1995

[54] APPARATUS AND METHODS FOR COMBINING VIDEO SIGNALS REPRESENTING IMAGES HAVING DIFFERENT DEPTHS

[75] Inventor: Masahiko Oka, Tokyo, Japan

[73] Assignee: Sony Corporation, Tokyo, Japan

[21] Appl. No.: 139,890

[22] Filed: Oct. 22, 1993

[30] Foreign Application Priority Data

Oct. 22, 1992 [JP] Japan .................. 4-284555

[51] Int. Cl.⁶ ........................................... H04N 5/262
[52] U.S. Cl. .................... 348/585; 348/591
[58] Field of Search ............... 348/585, 586, 591, 598; H04N 5/262, 5/272, 9/76, 9/265; 395/122, 158

[56] References Cited

U.S. PATENT DOCUMENTS

| | | | |
|---|---|---|---|
| 3,764,732 | 6/1972 | Macheboeuf | 348/598 |
| 4,360,831 | 11/1980 | Kellar | 348/585 |
| 4,774,583 | 9/1988 | Kellar et al. | 348/585 |
| 5,121,210 | 6/1992 | Hirayama | 348/591 |
| 5,280,568 | 1/1994 | Osata | 395/122 |

FOREIGN PATENT DOCUMENTS

0486468 5/1992 European Pat. Off. ...... H04N 5/265
2155729 9/1985 United Kingdom ........ H04N 5/272

*Primary Examiner*—James J. Groody
*Assistant Examiner*—Jeffrey S. Murrell
*Attorney, Agent, or Firm*—William S. Frommer; Alvin Sinderbrand

[57] ABSTRACT

At least three video signals including at least one video signal which is given special effects are combined into a single video signal. Each of the three video signals contains a key signal and depth information. Two video signals closer to a viewpoint for images represented by the video signals are selected from the at least three video signals, per pixel, by comparing the depth information contained in the video signals per pixel to detect two pieces of depth information corresponding to two pixels closer to said viewpoint, and holding the two pixels corresponding to the detected two pieces of depth information based on the detected two pieces of depth information. Then, the selected video signals are weighted and mixed based on the key signals and depth information thereof per pixel.

12 Claims, 9 Drawing Sheets

FIG. 9

| Key Input | Depth Position Input | Combiner Output |
|---|---|---|
| ko1=ko2=0 | | 0 |
| ko1=0, ko2≠0 | | vo2×ko2 |
| ko1≠0, ko2=0 | | vo1×ko1 |
| ko1≠0 ko2≠0 | zo1≦zo2 | vo1×ko1+vo2×(1−ko1)×ko2 |
| ko1≠0 ko2≠0 | zo1>zo2 | vo1×(1−ko2)×ko1+vo2×ko2 |

1

APPARATUS AND METHODS FOR COMBINING VIDEO SIGNALS REPRESENTING IMAGES HAVING DIFFERENT DEPTHS

BACKGROUND OF THE INVENTION

1. Field of the Invention

The present invention relates to an apparatus for combining a plurality of video signals into a single video signal.

2. Description of the Related Art

It has heretofore been customary for broadcasting stations or the like to use a video signal processor having combiners for mixing or combining a plurality of television video signals that have been given special effects by special effects systems (DME), for example.

For example, one special effects system generates an image which looks like a three-dimensional curved surface with an input video signal applied thereto. Such a special effects system is proposed in U.S. Pat. No. 4,965,844, for example.

U.S. Pat. No. 4,488,169, for example, discloses a so-called chroma key system which combines two video signals, i.e., a foreground signal and a background signal, into a single video signal based on a key signal that is extracted from the foreground signal.

Video signal processors employing a certain number of combiners will be described in detail below with reference to FIGS. 1 through 5 of the accompanying drawings.

In FIG. 1, a video signal processor includes special effects systems (DME) 1, 2, 3 for processing signals to given them special effects. Signals (video, key, and depth signals) which have been given special effects by the DMEs 1, 2 are supplied to a 2-ch combiner 4, and signals (video, key, and depth signals) that have been given special effects by the DME 3 are supplied to a 2-ch combiner 5.

The 2-ch combiner 4 combines the video signals supplied respectively from the DMEs 1, 2 into a single video signal based on the depth information and the key signal, for example. The produced single video signal is supplied, together with the key signal and the depth signal, to the 2-ch combiner 5.

The 2-ch combiner 5 combines the video signal supplied from the 2-ch combiner 4 and the video signal supplied from the DME 3 into a single video signal based on the depth information and the key signal. The produced video signal is supplied through an output terminal 6 to a television monitor (not shown), for example, which displays an image on its screen.

Therefore, the video signal processor can combine a plurality of video signals based on the depth and key signals for smoothing edges and points of intersection.

The combining process of the 2-ch combiners will be described below with reference to FIG. 2. When images A, B intersect with each other as shown in FIG. 2, the images A, B are mixed with respect to an edge a using a key signal Ka of the image A. The mixing of the images A, B with respect to the edge a is represented by the following formula (1):

$$Ka \cdot A + (1 - Ka) \cdot B (0 \leq Ka \leq 1) \tag{1}$$

With respect to an edge b, the images A, B are mixed using a key signal Kb of the image B. The mixing of the images A, B with respect to the edge b is represented by the following formula (2):

$$Kb \cdot B + (1 - Kb) \cdot A (0 \leq Kb \leq 1) \tag{2}$$

With respect to an edge c, an image (indicated by F) and a background BG are mixed using a combined key Kbg of the key signals Ka, Kb>. The mixing of the image F and the background BG with respect to the edge c is represented by the formula (3):

$$Kbg \cdot F + (1 - Kbg) \cdot BG \} Kbg = 1 - (1 - Ka)(1 - Kb) \} \tag{3}$$

With respect to an edge d, a priority signal (a type of key signal) Zab is generated using a depth signal Za of the image A and a depth signal Zb of the image B, and the images A, B are mixing using the priority signal Zab. The mixing of the images A, B with respect to the edge d is represented by the following formula (4):

$$Zab \cdot A + (1 - Zab) \cdot B \tag{4}$$

By thus mixing the image signals using the key signals and the depth signals, all the edges can be smoothed.

The mixing of three channels or more with two or more 2-channel combiners that are connected in cascade as shown in FIG. 1 will be described below with reference to FIGS. 1 and 3A, 3B.

In FIGS. 3A, A, B, and C represent images, respectively. If the output signal from the DME 1 represents the image A, the output signal from the DME 2 represents the image B, and the output signal from the DME 3 represents the image C, then the images A, B are combined by the 2-ch combiner 4, and the output signal from the 2-ch combiner 4 and the image C are combined by the 2-ch combiner 5. The key and depth signals are similarly combined into a single key signal and a single depth signal.

At this time, as shown in FIG. 3B, the images A, B that are closer to a viewpoint p are mixed with each other, and thereafter the image C that is remotest from the viewpoint p is mixed. Therefore, an output image has no problem.

If the output signal from the DME 1 represents the image A, the output signal from the DME 2 represents the image C, and the output signal from the DME 3 represents the image B, then the images A, C are combined by the 2-ch combiner 4, and the output signal from the 2-ch combiner 4 and the image B are combined by the 2-ch combiner 5.

At this time, as shown in FIG. 3B, the image A that is closest to the viewpoint p and the image C that is remotest from the viewpoint p are mixed with each other, and thereafter the image B that is second closest to the viewpoint p is mixed. This poses a problem to an edge of an output image because the order of mixing of the images and the priority of the images (the closeness of the images to the viewpoint or the relationship of the levels of the images) do not match each other.

A degradation of the image quality due to such a mismatch between the order of mixing of the images and the priority of the images will be described in greater detail with reference to FIGS. 4A and 4B.

FIG. 4A illustrates an output image which is produced by mixing the images A, C and then mixing the mixed image and the image B. As shown in FIG. 4A, the image C which should not appear between the images A, B shows as a dithering area between the images A, B.

One way of preventing the image from being degraded as shown in FIG. 4A is not to mix the images A, C. However, such a solution also creates a dithering area along the edge between the images A, B as shown in FIG. 4B.

The image degradations shown in FIGS. 4A and 4B may be avoided by mixing the images A, B, C in the descending or ascending order of priority. However, in the system composed of the DMEs and the combiners, unlike switchers, the priority of each image varies from pixel to pixel, making it impossible to obtain good image quality in all positions on the displayed screen image.

For example, a problem occurs if the image A is semitransparent and the image B is opaque. More specifically, if the images A, C are mixed first, then the image C shows which should not appear because the image B is opaque. This problem is the same as the edge problem.

A solution to the above problem is a cascade system which take into account image priority as shown in FIG. 5.

In FIG. 5, the cascade system has input terminals 7, 8, 9 which are supplied with video, key, and depth signals. The video, key, and depth signals supplied to the input terminals 7, 8, 9 are supplied to a matrix switcher 10. The depth signals from the respective input terminals 7, 8, 9 are also supplied to a priority determining circuit 11.

The priority determining circuit 11 supplies a control signal to the matrix switcher 10 based on the depth signals that are supplied from the input terminals 7, 8, 9.

Based on the control signal supplied from the priority determining circuit 11, the matrix switcher 10 supplies two video signals of higher (lower) priority, among the video signals from the input terminals 7, 8, 9, to a combiner 12, and also supplies a video signal of lowest (highest) priority to a combiner 13.

Therefore, the combiner 12 combines the two video signals of higher (lower) priority and produces a combined output signal, which is then combined with the video signal of lowest (highest) priority by the combiner 13. Consequently, no image degradation occurs in the image combined by the cascade system shown in FIG. 5.

It is assumed that the video, key, and depth signals supplied to the input terminal 7 are indicated by Va, Ka, Za, respectively, the video, key, and depth signals supplied to the input terminal 8 are indicated by Vb, Kb, Zb, respectively, the video, key, and depth signals supplied to the input terminal 9 are indicated by Vc, Kc, Zc, respectively, the depth signals Za, Zb, Zc have a priority relationship: Za>Zb>Zc, the matrix switcher 10 has input terminals I1, I2, I3 arranged in the order named from above, and output terminals O1, O2, O3 arranged in the order named from above. Now, the matrix switcher 10 effects switching on the input and output terminals as follows:

when Za≦Zb≦Zc, I1=O1, I2=O2, I3=O3, when Za≦Zc≦Zb, I1=O1, I3=O2, I2=O3, when Zb≦Za≦Zc, I2=O1, I1=O2, I3=O3, when Zb≦Zc≦Za, I1=O1, I3=O2, I2=O3, when Zc≦Za≦Zb, I2=O1, I1=O2, I3=O3, and when Zc≦Zb≦Za, I1=O1, I2=O2, I3=O3 (5)

The above process can be achieved by placing the matrix switcher 10 in front of the cascaded combiners 12, 13, and is effective to preventing the above image degradation.

However, if the number of channels is increased, then the circuit scale of the matrix switcher 10 is also increased.

There has also been proposed a process of mixing 2-ch images simultaneously rather than with the cascaded arrangement.

An output image signal Vobg produced by mixing the 2-ch images according to such a mixing process is indicated by the following equation (6):

$$Vobg = \{ZabKa + (1 - Zab) \cdot Ka(1 - Kb)\} \times \qquad (6)$$
$$Va + \{(1 - Zab)Kb + ZabKb(1 - Ka)\} \times$$
$$Vb + (1 - Ka)(1 - Kb) \times Vbg$$

where $0 \leq Zab \leq 1$, Zab represents the priority of the images A, B, indicating that the image B is of a higher level when Zab=1 and the image A is of a higher level when Zab=1. The key signal Ka of the image A is 0 or more, and the key signal Kb of the image B is 1 or less.

An output signal V0 produced when the mixed image is not outputted is indicated by the following equation (7):

$$V0 = [\{ZabKa + (1 - Zab)Ka(1 - Kb)\} \times \qquad (7)$$
$$Va + \{(1 - Zab)Kb + ZabKb(1 - Ka)\} \times Vb] \times$$
$$1/\{1 - (1 - Ka)(1 - Kb)\}.$$

The combined key signal Kbg is indicated by Kbg=1−(1−Ka)(1−Kb). When the 2-ch images are mixed simultaneously, therefore, the output image is prevented from being degraded.

When 3-ch images are mixed with each other, an output image signal Vobg is produced as indicated by the following equation (8):

$$Vobg = [\{Zab + (1 - Zab)(1 - Kb)\} \times \qquad (8)$$
$$\{Zac + (1 - Zac)(1 - Kc)\} \times Ka \times Va +$$
$$\{(1 - Zab) + Zab(1 - Ka)\} \times$$
$$\{Zbc + (1 - Zbc)(1 - Kc)\} \times Kb \times Vb +$$
$$\{(1 - Zac) + Zac(1 - Ka)\} \times$$
$$\{(1 - Zbc) + (1 - Kb)\} \times Kc \times Vc] \times$$
$$1/\{1 - (1 - Ka)(1 - Kb)(1 - Kc)\}.$$

The combined key signal Kbg is indicated by Kbg=1−(1−Ka)(1−Kb)(1−Kc). Similarly, 4-ch images can be mixed without output image degradations.

The applicant has previously proposed a special effects system for transmitting depth information using a serial transmission path which has the same specifications as those of a serial transmission line for transmitting digital signals (see, for example, U.S. patent application Ser. No. 07/798,153).

According to the above mixing processes, the amount of calculations increases in proportion to {n(n−1)} for mixing images in n channels. For example, the amount of calculations for mixing images in three channels is three times the amount of calculations for mixing images in two channels, and the amount of calculations for mixing images in four channels is six times the amount of calculations for mixing images in two channels. As the number of channels increases, therefore, the amount of calculations required increases, requiring the overall system to be of a complex and large circuit arrangement.

OBJECTS AND SUMMARY OF THE INVENTION

It is therefore an object of the present invention to provide an apparatus for combining a plurality of video signals which is of a relatively small scale and simple arrangement and is capable of combining video signals in a plurality of channels into a video signal of high quality.

According to the present invention, there is provided an apparatus for combining a plurality of video signals into a single video signal, comprising receiving means for receiving M video signals, selecting means connected to the receiving means, for selecting N video signals of higher priority from the M video signals (M>N) in each predetermined period of time, and weighting and mixing means connected to the selecting means, for weighting and mixing the N video signals selected by the selecting means in the each predetermined period of time.

According to the present invention, there is also provided an apparatus for combining a plurality of video signals into a single video signal, comprising receiving means for receiving a plurality of video signals each containing a key signal and depth information, selecting means connected to the receiving means, for selecting two video signals closer to a viewpoint for images represented by the video signals, from the plurality of video signals based on the depth information in each predetermined period of time, and weighting and mixing means connected to the selecting means, for weighting and mixing the video signals selected by the selecting means based on the key signals and depth information thereof in the each predetermined period of time.

According to the present invention, there is also provided an apparatus for combining at least three video signals including at least one video signal which is given special effects, into a single video signal, comprising receiving means for receiving at least three video signals, including at least one video signal which is given special effects, each of the at least three video signals containing a key signal and depth information, selecting means connected to the receiving means, for selecting two video signals closer to a viewpoint for images represented by the video signals, from the at least three video signals including at least one video signal which is given special effects, per pixel, the selecting means comprising detecting means for comparing the depth information contained in the video signals per pixel to detect two pieces of depth information corresponding to two pixels closer to the viewpoint, and holding means for holding the two pixels corresponding to the detected two pieces of depth information based on the detected two pieces of depth information, and weighting and mixing means connected to the selecting means, for weighting and mixing the video signals selected by the selecting means based on the key signals and depth information thereof per pixel.

According to the present invention, there is further provided a method of combining a plurality of video signals into a single video signal, comprising the steps of receiving M video signals, selecting N video signals of higher priority from the M video signals (M>N) in each predetermined period of time, and weighting and mixing the selected N video signals in the each predetermined period of time.

According to the present invention, there is also provided a method of combining a plurality of video signals into a single video signal, comprising the steps of receiving a plurality of video signals each containing a key signal and depth information, selecting two video signals closer to a viewpoint for images represented by the video signals, from the plurality of video signals based on the depth information in each predetermined period of time, and weighting and mixing the selected video signals based on the key signals and depth information thereof in the each predetermined period of time.

According to the present invention, there is also provided a method of combining at least three video signals including at least one video signal which is given special effects, into a single video signal, comprising the steps of receiving at least three video signals, including at least one video signal which is given special effects, each of the at least three video signals containing a key signal and depth information, selecting two video signals closer to a viewpoint for images represented by the video signals, from the at least three video signals including at least one video signal which is given special effects, per pixel, by comparing the depth information contained in the video signals per pixel to detect two pieces of depth information corresponding to two pixels closer to the viewpoint, and holding the two pixels corresponding to the detected two pieces of depth information based on the detected two pieces of depth information, and weighting and mixing the selected video signals based on the key signals and depth information thereof per pixel.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 9 is a table showing mixing conditions of a back end mixer of the apparatus shown in FIGS. 6 and 7.

DETAILED DESCRIPTION OF THE PREFERRED EMBODIMENTS

Figure 1:
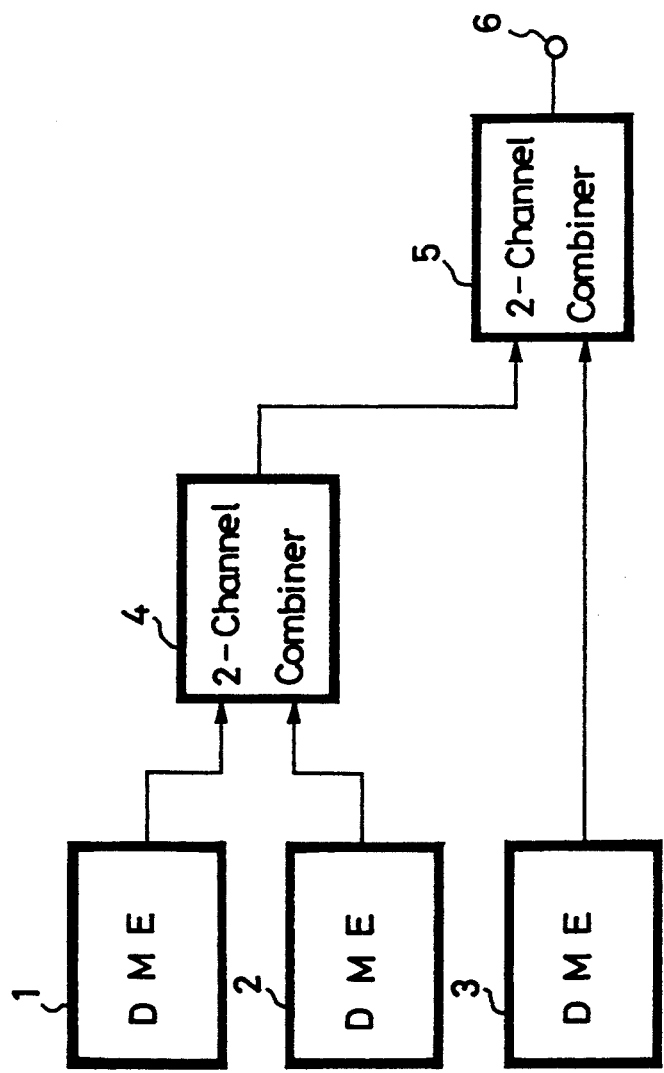
FIG. 1 is a block diagram of a conventional video signal processor including cascaded 2-ch combiners.
Figure 2:
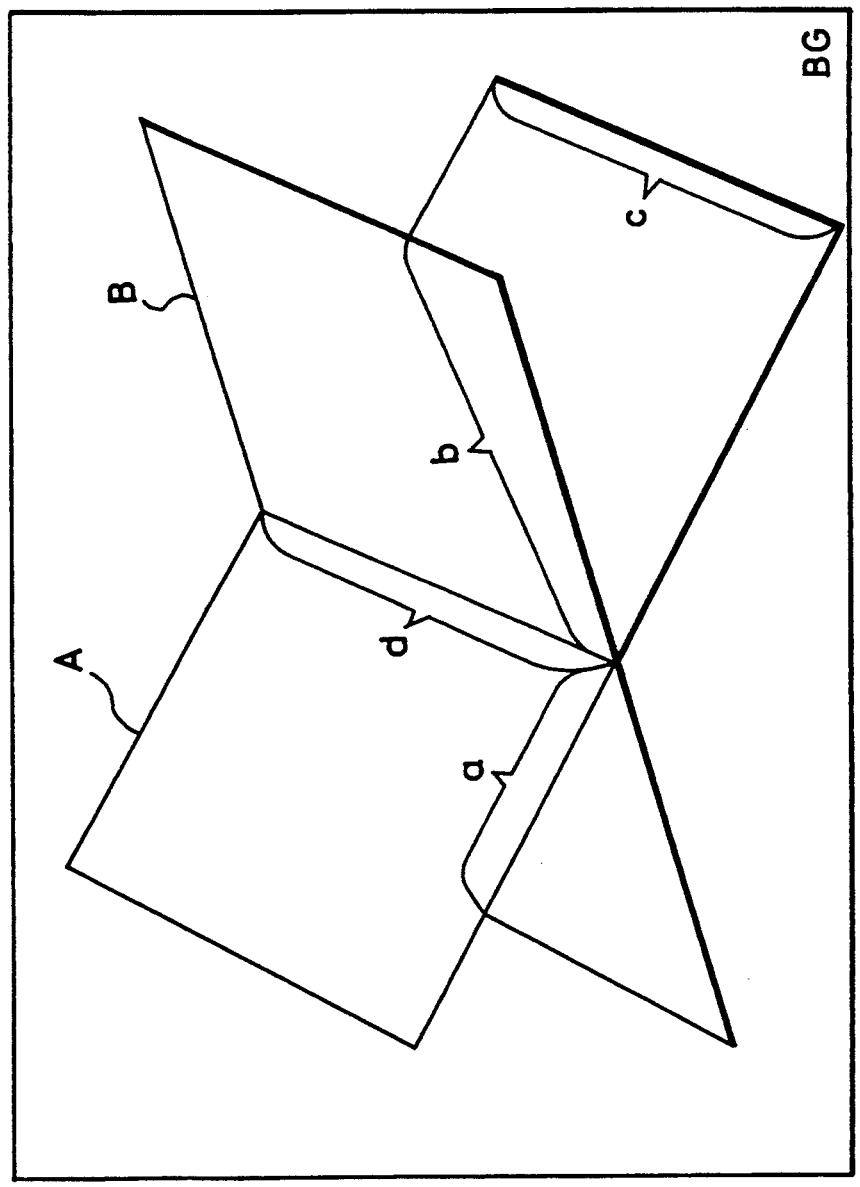
FIG. 2 is a diagram illustrative of a mixing or combining process using 2-ch combiners.
Figure 3A:
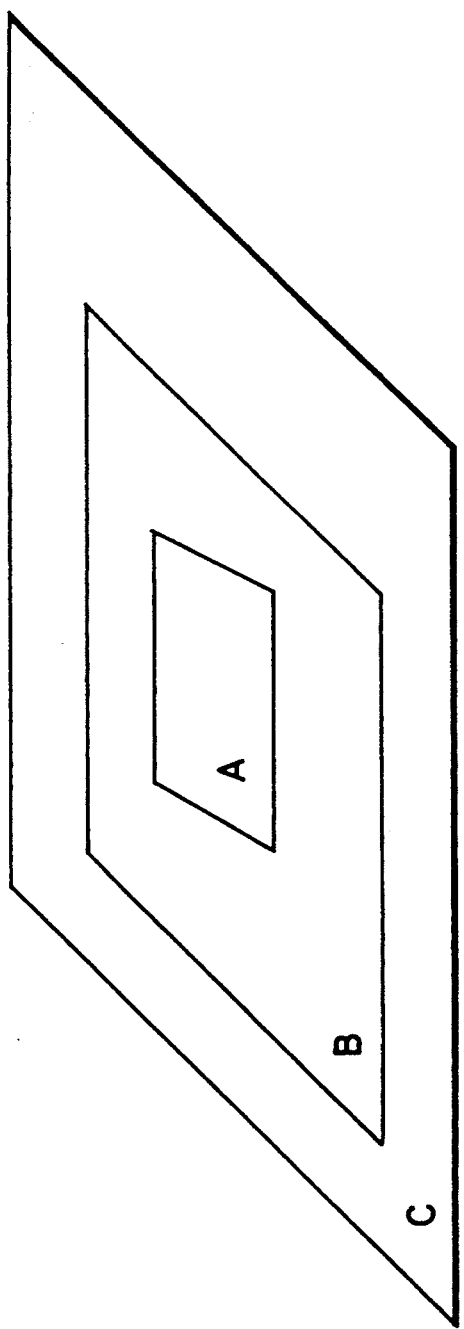
FIGS. 3A and 3B are diagrams illustrative of a mixing or combining process using 2-ch combiners.
Figure 3B:
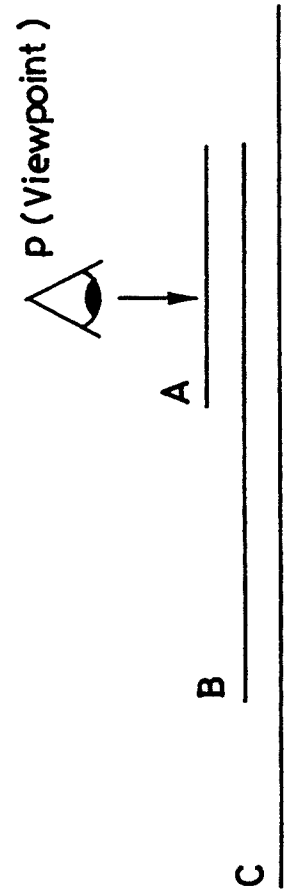
Figures 4A, 4B:
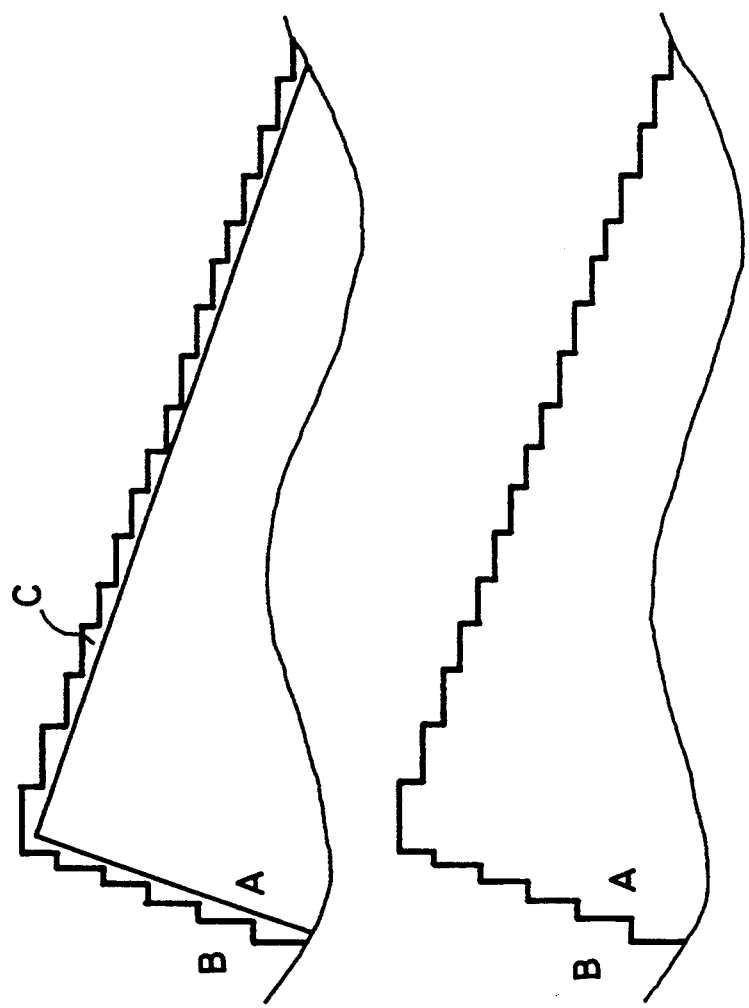
FIGS. 4A and 4B are diagrams showing image degradations caused due to a mismatch between the order of mixing of images and the priority of the images.
Figure 5:
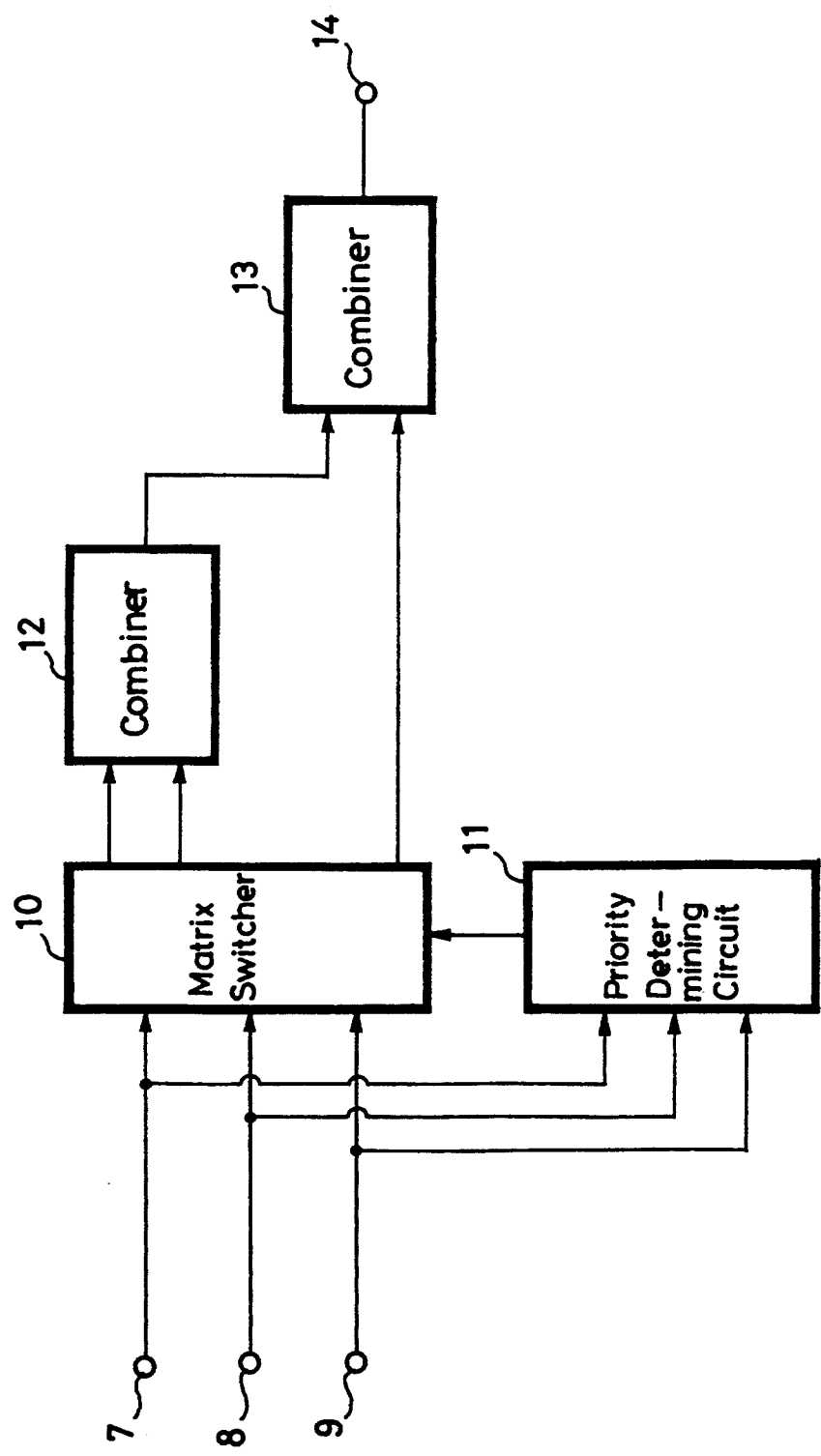
FIG. 5 is a block diagram of another conventional video signal processor including cascaded 2-ch combiners with means for taking into account image priority.
Figure 6:
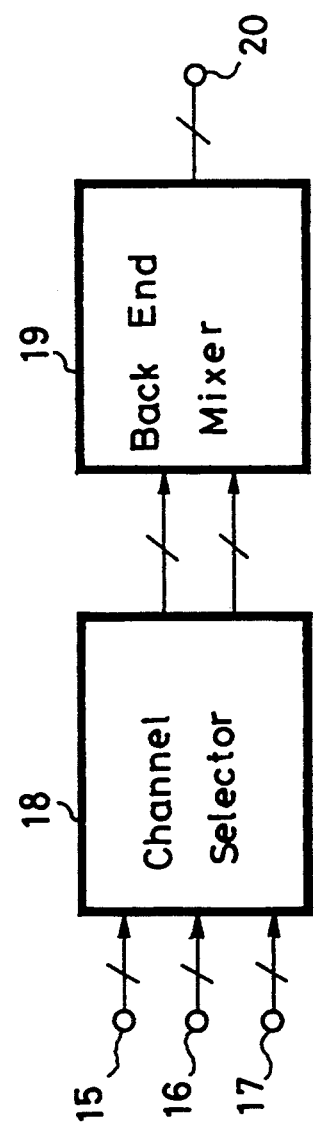
FIG. 6 is a block diagram of an apparatus for combining a plurality of video signals according to an embodiment of the present invention.

As shown in FIG. 6, an apparatus for combining a plurality of video signals according to an embodiment of the present invention has an input terminal 15 for being supplied with output signals (video, key, and depth signals) from a special effect device (DME), and input terminals 16, 17 for being supplied with background signals (video, key, and depth signals) from DMEs.

The apparatus also has a channel selector 18 which is supplied with the output signals from the input terminals 15, 16, 17. The channel selector 18 compares the depth signals per pixel among the output signals from the DMEs which are supplied from the input terminals 15, 16, 17, and selects and holds two of the three video signals and corresponding key and depth signals depending on the result of comparison, and thereafter supplies the held signals to a back end mixer 19.

The back end mixer 19 weights and mixes the two video signals from the channel selector 18 based on the depth and key signals per pixel thereby to produce a mixed output signal representative of a high-quality image with smooth edges. The mixed output signal is then supplied through an output terminal 20 to a television monitor or the like (not shown) which displays an image on its screen.

The channel selector 18 and the back end mixer 19 jointly serve as a combiner.

An apparatus for combining a plurality of video signals on a plurality of channels according to another embodiment of the present invention will be described below with reference to FIG. 7.

Figure 7:
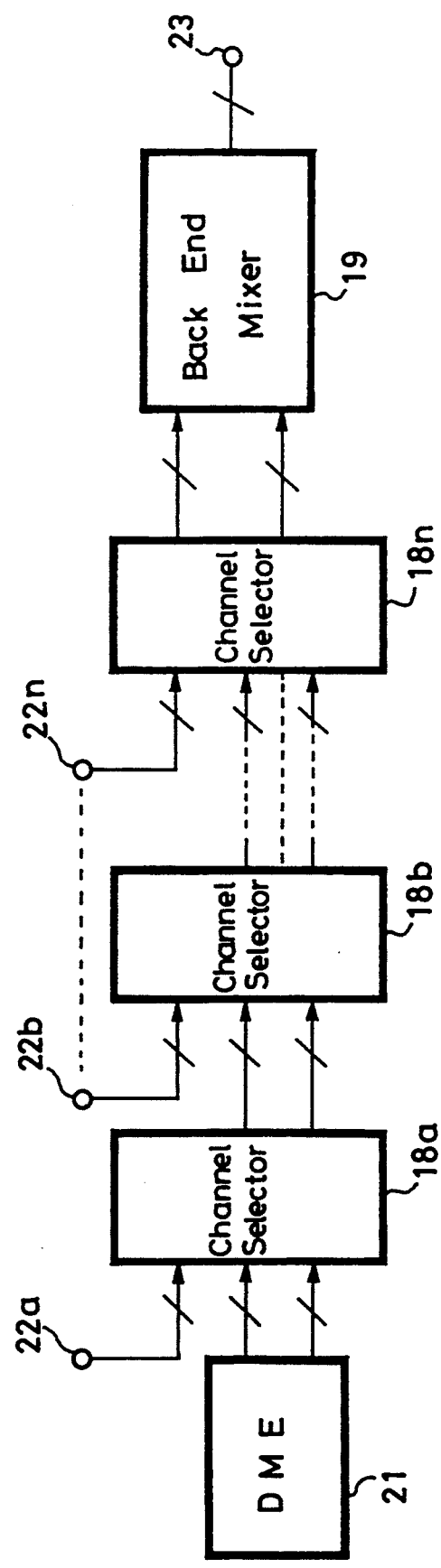
FIG. 7 is a block diagram of an apparatus for combining a plurality of video signals according to another embodiment of the present invention.

As shown in FIG. 7, two background signals are supplied from a DME 21 to a channel selector 18a. The channel selector 18a compares depth signals of the two background signals from the DME 21 and a video signal supplied from a VTR or the like, for example, through an input terminal 22a, per pixel, and selects and holds two video signals that are closest to a viewpoint. The channel selector 18a then supplies the two video signals to a channel selector 18b. The channel selector 18b compares depth signals of the two video signals from the DME 21 and a video signal supplied from the VTR or the like through an input terminal 22b, per pixel, and selects and holds two video signals that are closest to the viewpoint. Similarly, a channel selector 18n compares depth signals of the two video signals from a channel selector 18(n−1) and a video signal supplied from the VTR or the like through an input terminal 22n, per pixel, and selects and holds two video signals that are closest to the viewpoint. The two video signals are then supplied from the channel selector 18n to a back end mixer 19.

The back end mixer 19 weights and mixes the two video signals from the channel selector 18n based on the depth and key signals per pixel thereby to produce a combiner output signal. The combiner output signal is then supplied through an output terminal 23 to a television monitor or the like (not shown) which displays an image on its screen.

The channel selectors 18, 18a, 18b, ..., 18n shown in FIGS. 6 and 7 will be described below with reference to FIG. 8.

Figure 8:
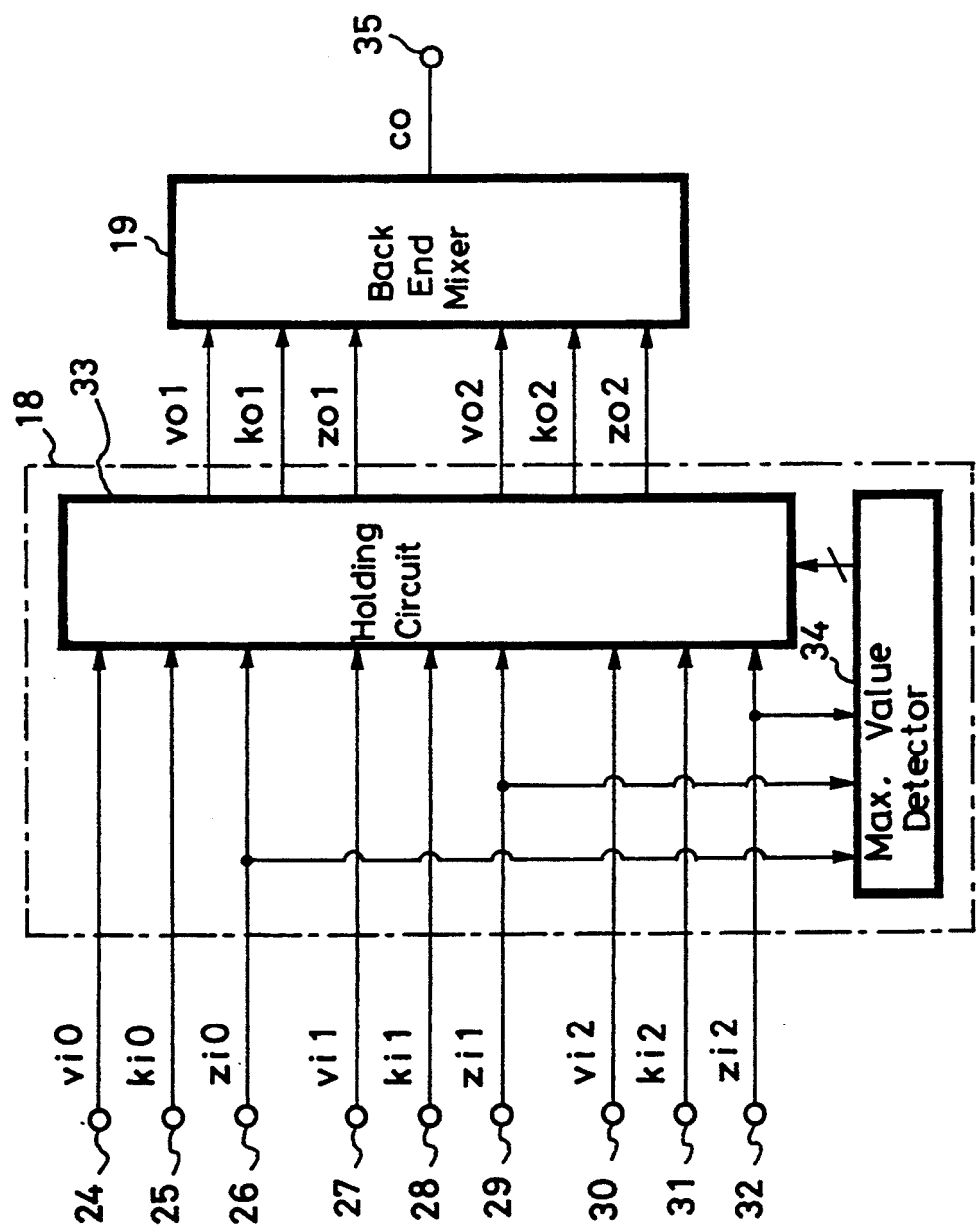
FIG. 8 is a block diagram of a channel selector of the apparatus shown in FIGS. 6 and 7.

As shown in FIG. 8, each of the channel selectors 18, 18a, 18b, ..., 18n comprises a maximum value detector 34 for outputting a control signal based on depth signals of input signals supplied thereto, and a holding circuit 33 for holding the input signals based on the control signal from the maximum value detector 34.

A video signal vi0 supplied through an input terminal 24 is supplied to the holding circuit 33 of the channel selector. A key signal ki0 supplied through an input terminal 25 is supplied to the holding circuit 33 of the channel selector. A depth signal zi0 supplied through an input terminal 26 is supplied to the holding circuit 33 and maximum value detector 34 of the channel selector. A video signal vi1 supplied through an input terminal 27 is supplied to the holding circuit 33 of the channel selector. A key signal ki1 supplied through an input terminal 28 is supplied to the holding circuit 33 of the channel selector. A depth signal zi1 supplied through an input terminal 29 is supplied to the holding circuit 33 and maximum value detector 34 of the channel selector. A video signal vi2 supplied through an input terminal 30 is supplied to the holding circuit 33 of the channel selector. A key signal ki2 supplied through an input terminal 31 is supplied to the holding circuit 33 of the channel selector. A depth signal zi2 supplied through an input terminal 32 is supplied to the holding circuit 33 and maximum value detector 34 of the channel selector.

The input terminals 24, 25, 26 correspond to the input terminal 15 shown in FIG. 6, the input terminals 27, 28, 29 correspond to the input terminal 16 shown in FIG. 6, and the input terminals 30, 31, 32 correspond to the input terminal 17 shown in FIG. 6. The smaller the number of the suffix applied to the depth signal, the closer the image represented by the corresponding video signal is to the viewpoint.

Operation of the channel selector 18 and the back end mixer 19 shown in FIG. 8 will be described below.

The depth signals zi0, zi1, zi2 supplied to the channel selector 18 are compared by the maximum value detector 34, which checks and supplies the depth signal zi0, zi1 or zi2 which is of the largest value as a control signal indicative of input signals to be discarded, to the holding circuit 33.

The holding circuit 33 is supplied with all the three sets of video, key, and depth signals, and selects and holds two sets of input signals (closer to the video signal) other than the set of input signals which is indicated by the control signal from the maximum value detector 34.

The two sets of input signals (video, key, and depth signals) which are held by the holding circuit 33 are supplied as selected output signals vo1 (video signal), ko1 (key signal), zo1 (depth signal), vo2 (video signal), ko2 (key signal), and zo2 (depth signal) to the back end mixer 19. These output signals are then mixed by the back end mixer 19 into a video signal, which is supplied to the television monitor that displays a high-quality image on its screen.

In the multi-channel combiner as shown in FIG. 7, the channel selectors 18a~18n repeat the above operation. It can be understood from FIG. 7 that one channel selector is required to be added when one channel is added.

Operation of the back end mixer 19 will be described below with reference to FIG. 9.

As shown in FIG. 9, the selected output signals vo1, ko1, zo1 and vo2, ko2, zo2 from the channel mixer 18 shown in FIG. 8 are weighted and mixed depending on the values of the key and depth signals, and outputted as a combiner output signal co.

More specifically, as shown in FIG. 9, when the key signals ko1, ko2 are "0", the combiner output signal co is "0". When the key signal ko1 is "0" and the key signal ko2 is not "0", the combiner output signal co is equal to the product of the video signal vo2 and the key signal ko2. When the key signal ko1 is not "0" and the key signal ko2 is "0", the combiner output signal co is equal to the product of the video signal vo1 and the key signal ko1.

When the key signals ko1, ko2 are not "0", the depth signals zo1, zo2 are compared with each other. If the depth signal zo1 is equal to or smaller than the depth signal zo2, then the combiner output signal co is the sum of the product of the video signal vo1 and the key signal ko1, and the product of the video signal vo2, the difference between 1 and the key signal ko1, and the key signal ko2.

If the depth signal zo1 is larger than the depth signal zo2, then the combiner output signal co is the sum of the product of the video signal vo1, the difference between 1 and the key signal ko2, and the key signal ko1, and the product of the video signal vo2 and the key signal ko2.

Since the channel selectors 18, 18a~18n are placed in front of the band end mixer 19, each of the channel selectors 18, 18a~18n selects and holds video signals corresponding to depth signals closest to the viewpoint, and the held signals are mixed based on the key and depth signals in the back end mixer 19, the quality of the image represented by the combiner output signal is improved regardless of matching between the order of mixing of the images and the depth information.

Since one channel can be added by adding a channel selector, the combiner may be of a minimum circuit scale and of a simple circuit arrangement.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An apparatus for combining a plurality of video signals into a single video signal, each of said video signals being comprised of a video image signal and being further comprised of a key signal and a depth information signal which depend on the video image signal, said apparatus comprising:
   receiving means for receiving M video signals;
   selecting means for selecting N of said M received video signals having a higher priority in a predetermined interval; and
   weighting and mixing means for weighting and mixing the selected N video signals as a function of the key signals and the depth information signals in said predetermined interval.

2. An apparatus according to claim 1, wherein said M video signals comprise at least three video signals, and said N video signals comprise two video signals.

3. An apparatus according to claim 1, wherein said predetermined interval is a pixel.

4. An apparatus according to claim 1, wherein said selecting means operates to select said N video signals that are closest to a viewpoint for viewing images represented by the video signals as a function of said depth information signals.

5. An apparatus for combining a plurality of video signals into a single video signal, comprising:
   receiving means for receiving a plurality of video signals each comprising a video image signal, a key signal and a depth information signal;
   selecting means for selecting two of said plurality of video signals that are closest to a viewpoint for viewing images represented by the video signals in a predetermined interval as a function of the depth information signals; and
   weighting and mixing means for weighting and mixing the selected video signals as a function of the key signals and the depth information signals thereof in said predetermined interval.

6. An apparatus according to claim 5, wherein said predetermined interval is a pixel.

7. An apparatus for combining a plurality of video signals into a single video signal, comprising:
   receiving means for receiving a plurality of video signals each comprising a video image signal, a key signal and a depth information signal;
   selecting means for selecting two of said plurality of video signals that are closest to a viewpoint for viewing images represented by the video signals in a pixel as a function of the depth information signals, said selecting means comprising
      detecting means for comparing the depth information signals contained in the video signals corresponding to said pixel to detect two of said depth information signals of two of said video signals that represent portions of a video image that are closest to said viewpoints, and
      holding means for holding the two video signals having the detected two depth information signals; and
   weighting and mixing means for weighting and mixing the selected video signals as a function of the key signals and the depth information signals thereof.

8. An apparatus for combining at least three video signals into a single video signal, at least one of said video signals representing special video effects, said apparatus comprising:
   receiving means for receiving at least three video signals, including said at least one video signal which represents special video effects, each of said video signals comprising a video image signal, a key signal and a depth information signal;
   selecting means for selecting, for each pixel, two video signals that are closest to a viewpoint for viewing images represented by the video signals from said at least three video signals;
   said selecting means comprising:
      detecting means for comparing the depth information signals contained in the video signals corresponding to said pixel to detect two of said depth information signals of two of said video signals that represent portions of a video image that are closest to said viewpoint, and
      holding means for holding the two video signals having the detected two depth information signals; and
   weighting and mixing means for weighting and mixing the selected video signals as a function of the key signals and depth information thereof.

9. A method of combining a plurality of video signals into a single video signal, each of said video signals being comprised of a video image signal and being further comprised of a key signal and a depth information signal which depend on the video image signal, said method comprising the steps of:

receiving M video signals;

selecting N of said M received video signals having a higher priority in a predetermined interval; and weighting and mixing the selected N video signals as a function of the key signals and the depth information signals in said predetermined interval.

10. A method of combining a plurality of video signals into a single video signal, comprising the steps of:

receiving a plurality of video signals each comprising a video image Signal, a key signal and a depth information signal;

selecting two of said plurality of video signals that are closest to a viewpoint for viewing images represented by the video signals in a predetermined interval as a function of the depth information signals; and weighting and mixing the selected video signals as a function of the key signals and the depth information signals thereof in said predetermined interval.

11. A method according to claim 10, wherein said step of selecting two of said plurality of video signals includes comparing the depth information signals contained in the video signals corresponding to said predetermined interval to detect two of said depth information signals of two of said video signals that represent portions of a video image that are closest to said viewpoint, and holding the video signals having the detected two depth information signals.

12. A method of combining at least three video signals into a single video signal, at least one of said video signals representing special video effects, said method comprising the steps of:

receiving at least three video signals, including said at least one video signal which represents special video effects, each of said video signals comprising a video image signal, a key signal and a depth information signal;

selecting, for each pixel, two video signals that are closest to a viewpoint for viewing images represented by the video signals from said at least three video signals, by comparing the depth information signals contained in the video signals corresponding to said pixel to detect two of said depth information signals of two of said video signals that represent portions of a video image that are closest to said viewpoint, and holding the two video signals having the detected two depth information signals; and weighting and mixing the selected video signals as a function of the key signals and depth information thereof.

* * * * *